(12) United States Patent
Seshadri et al.

(10) Patent No.: US 10,900,349 B2
(45) Date of Patent: Jan. 26, 2021

(54) ESTIMATION OF FLOW RATES USING ACOUSTICS IN A SUBTERRANEAN BOREHOLE AND/OR FORMATION

(71) Applicant: Halliburton Energy Services, Inc., Houston, TX (US)

(72) Inventors: Muralidhar Seshadri, Sugar Land, TX (US); Jonathan Ben Freund, Mansfield, IL (US); Yinghui Lu, The Woodlands, TX (US); Srinivasan Jagannathan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 513 days.

(21) Appl. No.: 15/574,482

(22) PCT Filed: Jul. 14, 2017

(86) PCT No.: PCT/US2017/042250
§ 371 (c)(1),
(2) Date: Nov. 15, 2017

(87) PCT Pub. No.: WO2018/013995
PCT Pub. Date: Jan. 18, 2018

(65) Prior Publication Data
US 2018/0230797 A1    Aug. 16, 2018

Related U.S. Application Data

(60) Provisional application No. 62/362,120, filed on Jul. 14, 2016.

(51) Int. Cl.
| | | |
|---|---|---|
| E21B 47/107 | (2012.01) | |
| E21B 47/117 | (2012.01) | |
| E21B 47/14 | (2006.01) | |
| G01V 1/40 | (2006.01) | |
| G01V 1/34 | (2006.01) | |

(52) U.S. Cl.
CPC .......... *E21B 47/107* (2020.05); *E21B 47/117* (2020.05); *E21B 47/14* (2013.01);
(Continued)

(58) Field of Classification Search
CPC .... E21B 47/101; E21B 47/1025; E21B 47/14; E21B 47/107; E21B 47/117; G01V 1/345;
(Continued)

(56) References Cited

U.S. PATENT DOCUMENTS

| | | |
|---|---|---|
| 7,464,588 B2 | 12/2008 | Steinsiek |
| 8,520,195 B2 | 8/2013 | Ramos et al. |

(Continued)

FOREIGN PATENT DOCUMENTS

| | | |
|---|---|---|
| GB | 2412966 A | 10/2005 |
| WO | WO-2012/027476 A1 | 3/2012 |

(Continued)

OTHER PUBLICATIONS

European Search Report for Application No. 17828582.1 dated Feb. 5, 2019.
(Continued)

*Primary Examiner* — Michael P Nghiem
*Assistant Examiner* — Dacthang P Ngo
(74) *Attorney, Agent, or Firm* — John Wustenberg; C. Tumey Law Group PLLC

(57) ABSTRACT

The subject technology relates to estimation of flow rates using acoustics in a subterranean borehole and/or formation. Other methods, systems, and computer-readable media are also disclosed. The subject technology includes drilling a wellbore penetrating a subterranean formation. The subject technology includes logging the wellbore using an acoustic sensing tool to obtain logged measurements, and obtaining acoustic pressure data associated with a leak source in the wellbore using the logged measurements. The subject tech- (Continued)

nology also includes determining a flow rate (volumetric for fluid-based or mass for gas-based) of the leak source from the acoustic pressure data, and determining an area of the leak source from the determined flow rate. The subject technology also includes generating and providing, for display, a representation of the leak source using the flow rate and the area of the leak source.

15 Claims, 7 Drawing Sheets

(52) U.S. Cl.
CPC .............. *G01V 1/345* (2013.01); *G01V 1/40* (2013.01); *G01V 2210/34* (2013.01)

(58) Field of Classification Search
CPC ... G01V 1/40; G01V 2210/34; D01V 2210/34
USPC .......................................................... 702/6
See application file for complete search history.

(56) References Cited

U.S. PATENT DOCUMENTS

| 2010/0059217 A1 | 3/2010 | Short | |
| 2014/0036627 A1* | 2/2014 | Hull | G01V 1/001 367/26 |
| 2014/0207390 A1 | 7/2014 | Zheng et al. | |
| 2015/0052979 A1* | 2/2015 | Cho | G01M 3/243 73/40.5 A |
| 2017/0350234 A1* | 12/2017 | Xia | E21B 47/06 |

FOREIGN PATENT DOCUMENTS

| WO | 2014105839 | 7/2014 |
| WO | 2016060688 | 4/2016 |
| WO | WO-2016/108914 A1 | 7/2016 |

OTHER PUBLICATIONS

Internationai Search Report and Written Opinion from PCT/US2017/042250, dated Sep. 18, 2017, 17 pages.

McKinley et al., "The Structure and Interpretation of Noise From Flow Behind Cemented Casing," SPE-3999-PA Society of Petroleum Engineers. Journal of Petroleum Technology, vol. 25, Issue 03, Mar. 1973, 10 pages.

Britt, "Theory and Applications of the Borehole Audio Tracer Survey," SPE-6552-MS Society of Petroleum Engineers, California Regional Meeting, Apr. 1977, Bakersfield, California , 35 pages.

* cited by examiner

ESTIMATION OF FLOW RATES USING ACOUSTICS IN A SUBTERRANEAN BOREHOLE AND/OR FORMATION

CROSS-REFERENCE TO RELATED APPLICATIONS

The present application is a National Stage entry of and claims priority to PCT Application No. PCT/US2017/042250, entitled "ESTIMATION OF FLOW RATES USING ACOUSTICS IN A SUBTERRANEAN BOREHOLE AND/OR FORMATION," filed on Jul. 14, 2017, which claims the benefit of priority under 35 U.S.C. § 119 from U.S. Provisional Patent Application Ser. No. 62/362,120 entitled "METHODS FOR ESTIMATION OF FLOW RATES USING ACOUSTICS IN A SUBTERRANEAN BOREHOLE AND/OR FORMATION," filed on Jul. 14, 2016, the disclosures of which are hereby incorporated by reference in their entirety for all purposes.

TECHNICAL FIELD

The present disclosure relates to acoustic sensing logging measurement systems, and more particularly to estimation of flow rates using acoustics in a subterranean borehole and/or formation.

BACKGROUND

Oilfield exploration activities routinely deploy tubular structures into subterranean formation wellbores (e.g., "downhole" locations or environments). Such tubulars, once installed, may stay in use for a long time, including up to several years and may be used to separate one or more fluids in different annular regions within the downhole environment. The structural and functional integrity of these tubulars is important in determining the life and productivity of a particular wellbore (e.g., a hydrocarbon producing wellbore). Tubular integrity may be compromised by several environmental and operational factors, such as corrosion, erosion, repeated impact from tools, and the like. Over time, some tubulars experience loss of material and develop cracks, holes, slits, or other ablations that allow fluids to flow from one region to another undesirable region. Timely detection of the leaks that occur in this manner may allow the tubulars to be repaired, thereby extending their life and improving the productivity of the wellbore in which they are deployed.

BRIEF DESCRIPTION OF THE DRAWINGS

The following figures are included to illustrate certain aspects of the implementations, and should not be viewed as exclusive implementations. The subject matter disclosed is capable of considerable modifications, alterations, combinations, and equivalents in form and function, as will occur to those skilled in the art and having the benefit of this disclosure.

DETAILED DESCRIPTION

Figure 1:
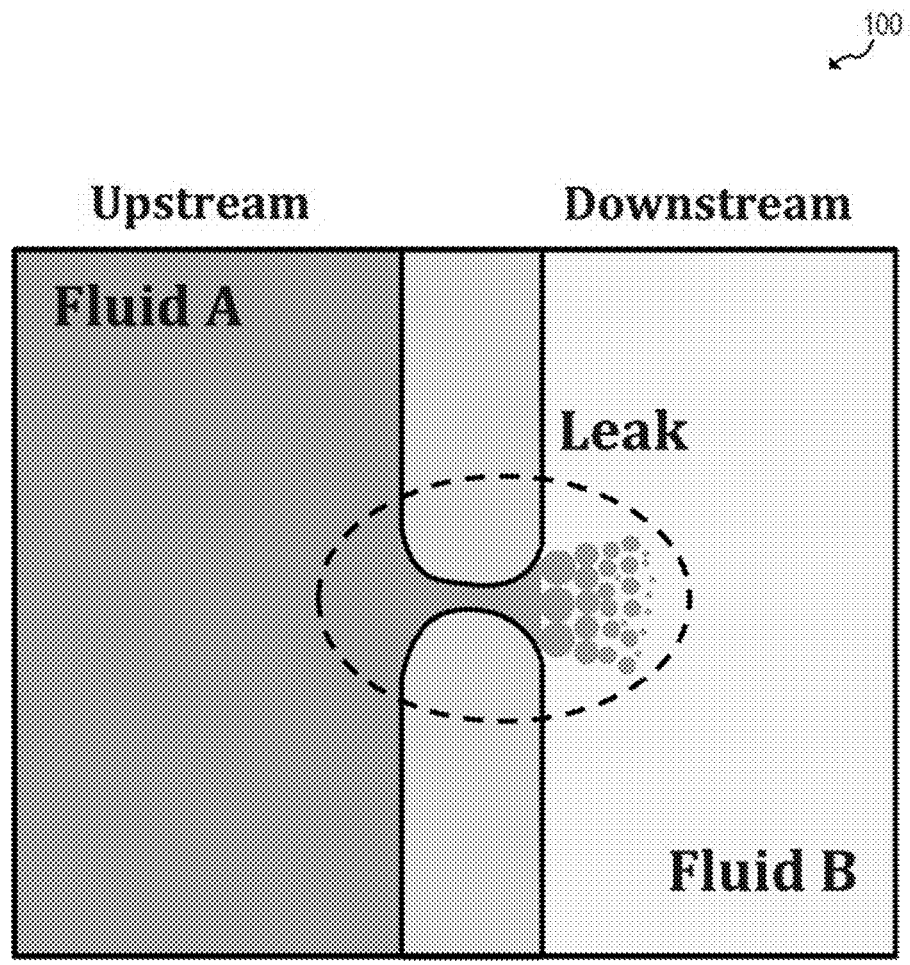
FIG. 1 illustrates an example of a two-dimensional schematic representation of a fluid leak across a solid barrier.

The present disclosure relates to subterranean formation operations and, more particularly, to estimation of flow rates in a subterranean borehole (i.e., wellbore) and/or formation using acoustics. The disclosed system addresses a problem in traditional acoustic sensing logging systems tied to computer technology, namely the technical problem of imaging an accurate detection of the volumetric flow rate of a leak in the subterranean formation and/or borehole. In traditional acoustic sensing logging systems, the algorithm used to estimate a leak source flow rate assumes that the sound generation originates from one type of mechanism and, therefore, may not provide an accurate estimate when more than one type of mechanism dominates the sound generation within the subterranean formation. In this respect, the traditional algorithm may not properly disseminate among the different types of sound generation mechanisms to provide comprehensive acoustic pressure data.

The disclosed system solves this technical problem by providing a solution also rooted in computer technology, namely, by implementing a different model to estimate the magnitude of pressure differentials between regions of a different type of leak (e.g., fluid leak, gas leak). Additionally, each of the models uses multiple distinct terms that respectively correspond to different noise-source mechanisms in order to describe the relation between flow rate and acoustic amplitude.

The subject technology provides several advantages over the traditional acoustic sensing logging systems. For example, the inclusion of the multiple distinct terms that represent the different mechanisms of sound generation being accounted for make the acoustic leak estimation of the subject technology more accurate and robust in predicting volumetric or mass flow rates of leaks, whereas the traditional systems consider only a single dominant mechanism for sound generation. The subject technology also removes acoustic tool noise from the measured acoustic data that helps improve the accuracy of the leak estimation. Additionally, the subject technology allows for the improvement in both prediction success rate as well as prediction error rate with the addition of new data to calibrate the model constants (e.g., coefficients).

The disclosed system further provides improvements to the functioning of the computer itself because it saves data storage space, reduces system loading times and reduces the cost of system resources. Specifically, the tool response modeling helps reduce the system loading latency by categorizing the type of regions being measured in order to select the proper model for calculating the flow rate (volumetric flow rate for fluid-based or mass flow rate for gas-based) of the subject leak. The use of coefficients from experimentally obtained data, numerical computations, or a combination thereof, streamlines the flow rate calculations, which helps to reduce both data storage space and the cost of system resources.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation, by geographical location, and from time to time. While a developer's efforts might be complex and time-consuming, such efforts would be, nevertheless, a routine undertaking for those of ordinary skill in the art having benefit of this disclosure.

As used herein, the term "tubular structures" or simply "tubulars," and grammatical variants thereof, refers to any type of oilfield pipe, such as casing, tubing, drill pipe, drill collars, flexible pipe (e.g., coiled tubing), pup joints, production tubing, pipeline, and the like.

The present disclosure may be employed to determine the magnitude of downhole liquid-to-liquid leaks and gas-to-gas leaks in a downhole environment by collecting and analyzing the sound generated by the leaks. The magnitude of such downhole leaks is evaluated based on estimated flow rate and the cross-sectional area of the leaks. As used herein, the term "volumetric flow rate" and "estimated volumetric flow rate" are used interchangeably, and refer to the volume of fluid which passes a reference point or area per unit time, and is estimated using the methods of the present disclosure, unless otherwise stated. As used herein, the term "mass flow rate" and "estimated mass flow rate" are used interchangeably, and refer to the mass of gas which passes a reference point or area per unit time, and is estimated using the methods of the present disclosure, unless otherwise stated. Openings (e.g., cracks, holes, slits, ablations, and the like) that occur or form in downhole tubulars generally have rough edges, which coupled with the magnitude of pressure differentials between regions of separated fluids leads to turbulent flow and consequent sound generation. The characteristics of the sound generated in a leak depend on the pressure differential, the size and shape of the opening, and the properties of the fluids involved. The present disclosure provides a method to estimate the flow rate of such leaks in situations where a liquid is leaking into another liquid, and/or when a gas is leaking into another gas in a downhole environment.

The volumetric flow of such leaks is determined using a downhole acoustic tool comprising a mandrel and at least one hydrophone, which is deployed downhole on a tool string. As used herein, the term "hydrophone," and grammatical variants thereof, refers to an instrument (e.g., a microphone) that detects sound waves in a liquid, encompassing both liquid-phases and gas-phases. As used herein, a "tool string," and grammatical variants thereof, refers to a single-strand or multi-strand wire or cable for wellbore intervention in a subterranean formation (e.g., in a wellbore). Tool strings may be capable conveying downhole tools to a location downhole and of transmitting data collected from such downhole tools to a surface location, and include wireline, slickline, and electric wire, for example. The downhole acoustic tool of the present disclosure would thus be part of the tool string for conveyance to a downhole location.

FIG. 1 illustrates an example of a two-dimensional schematic representation 100 of a fluid leak across a solid barrier. The leaking fluid is Fluid A, and it leaks into Fluid B. Fluid A is referred to as the leaking fluid, and Fluid B is referred to as the stationary fluid. This creates four distinct possibilities: 1) a liquid-to-liquid (LL) leak, 2) a gas-to-gas (GG) leak, 3) a liquid-to-gas (LG) leak, and 4) a gas-to-liquid (GL) leak. The liquid-to-liquid and the gas-to-gas leaks may be further classified into different cases based on whether the leaking fluid and the stationary fluid are the same or distinct. In any leak scenario, the known (or assumed) parameters are the identities of the two fluids and their physical properties such as density, molecular weight, etc. The known (or assumed) environmental and operating parameters are the temperature and pressure. The unknown parameters are the leak area and the flow rate of the fluid through the leak. The measured parameter is the root-mean-square (RMS) value of the acoustic pressure.

Figure 2:
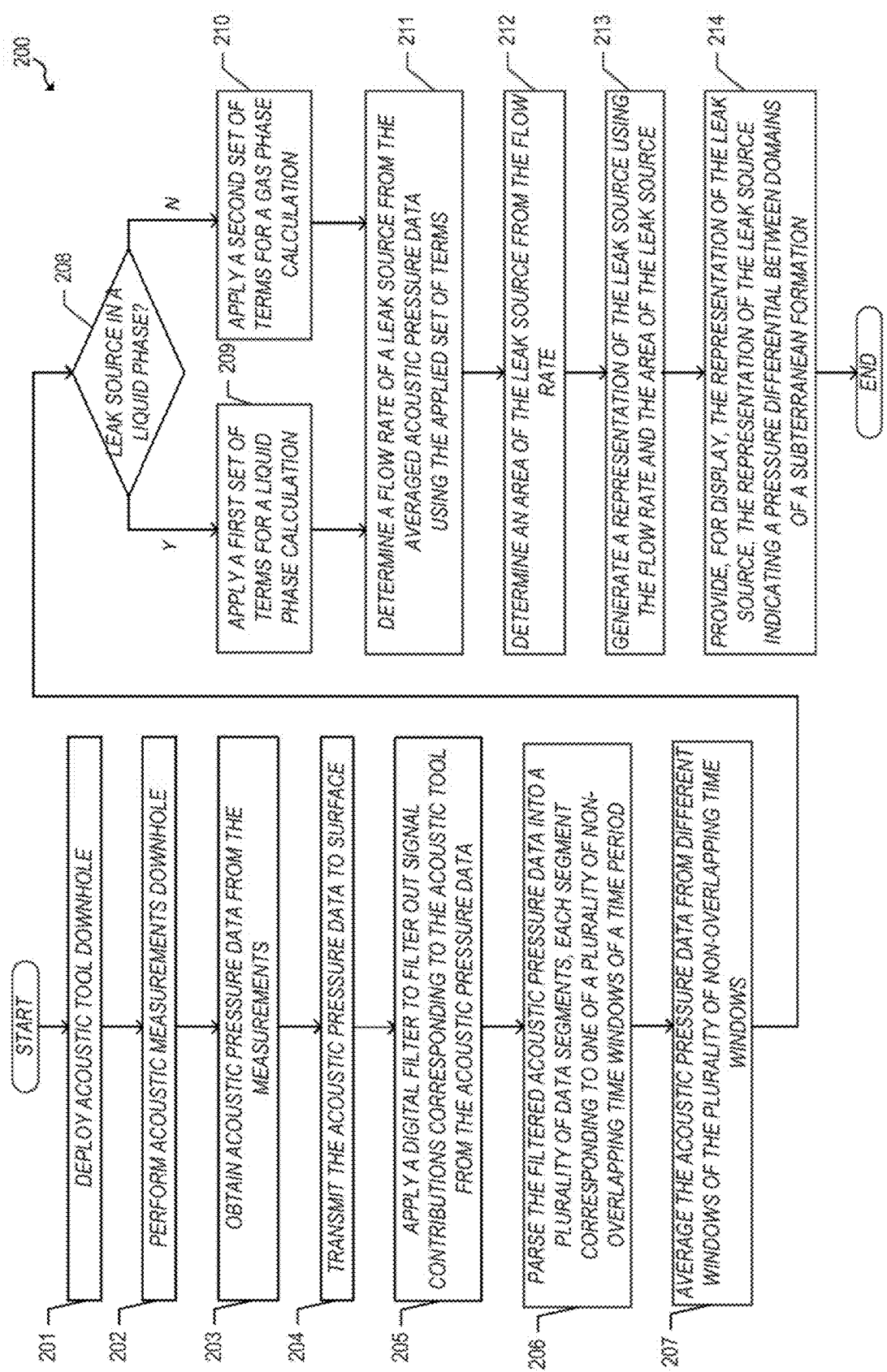
FIG. 2 illustrates a flowchart of an example process of an acoustics based estimation of flow rates in a subterranean borehole and/or formation.

FIG. 2 illustrates a flowchart of an example process 200 of an acoustics based estimation of flow rates in a subterranean borehole and/or formation. The process 200 begins at step 201, where an acoustic tool (e.g., downhole acoustic tool 116) is deployed downhole within a wellbore (e.g., wellbore 106).

Subsequently, in step 202, acoustic measurements are performed downhole using the downhole acoustic tool 116. Next, in step 203, acoustic pressure data is obtained from the measurements. Subsequently, in step 204, the acoustic pressure data is transmitted to the surface (e.g., 104).

Next, in step 205, a digital filter is applied to the acoustic pressure data to filter out signal contributions corresponding to the downhole acoustic tool 116 from the acoustic pressure data. Subsequently, in step 206, the filtered acoustic pressure data is parsed into data segments, where each segment may correspond to one of multiple non-overlapping time windows of a time period.

Table 1 provides the nomenclature associated with the subject technology. Some of the parameters are used only in the case of liquids, some only in the case of gases, and some in both cases.

TABLE 1

Parameter Nomenclature

| Parameter | Symbol | Type |
| --- | --- | --- |
| Heat capacity ratio of the leaking gas | k | Known (Fluid property) |
| RMS value of the acoustic pressure | p' | Measured |
| Fluid pressure on the upstream side of the leak, sufficiently far away from the leak | $p_0$ | Known (Environmental) |
| Fluid pressure on the downstream side of the leak, sufficiently far away from the leak | $p_\infty$ | Known (Environmental) |
| Leak area | A | Unknown |
| Volumetric flow rate of leaking liquid | Q | Unknown |
| Mass flow rate of leaking gas | $\dot{m}$ | Unknown |

The downhole acoustic tool measures the acoustic sound pressure data as a function of time, the data is transmitted to the surface, then the acoustic leak estimation methods of the present disclosure is employed to estimate acoustic leak and determine the volumetric flow rate for liquids and mass flow rate for gases, and leak area.

Next, in step 207, the acoustic pressure data from different windows of the non-overlapping time windows are averaged. Subsequently, in step 208, a determination is made on whether the leak source is in a liquid phase or a gas phase. The leak phase may represent a liquid-to-liquid region, and the gas phase may represent a gas-to-gas region. The process 200 proceeds to step 209 if it is determined that the leak source is a liquid phase, where a first set of terms for a liquid phase calculation is applied. On the other hand, if it is determined that the leak source is not a liquid phase (e.g., a gas phase), then a second set of terms for a gas phase calculation is applied.

Next, in step 211, a flow rate of the leak source is determined from the averaged acoustic pressure data using the applied set of terms. In a liquid phase, the volumetric flow rate is determined. In a gas phase, a mass flow rate is determined.

Traditionally, for comparison, the volumetric flow rate Q of a liquid through an opening of an area A is estimated according to Equation (1):

$$Q = C_f A \sqrt{\frac{2\Delta p}{\rho}} \qquad \text{Equation (1)}$$

where $\Delta p$ is the pressure differential across the leak, $\rho$ is the mass density of the leaking liquid, and $C_f$ is a known coefficient that accounts for losses in energy to friction of the surfaces, turbulence of the flow, sudden expansions and contractions in the flow area, changes in the direction of the flow, obstacles in the path of the flow, and the like (i.e., any loss in fluid flow), and any combination thereof.

The pressure differential may be determined according to Equation (2):

$$\Delta p = p_0 - p_\infty \qquad \text{Equation (2)}$$

where the operational inputs include (1) $p_0$ that refers to the fluid pressure on the upstream side of the leak, sufficiently far away from the leak, (2) $p_\infty$, that refers to the fluid pressure on the downstream side of the leak, sufficiently far away from the leak, and (3) p' that refers to the RMS value of the acoustic pressure.

The amplitude of the sound pressure p' generated due to the flow through the leak is determined according to Equation (3):

$$p' = C_a A (\Delta p)^{3/2} \qquad \text{Equation (3)}$$

where $C_a$ is a proportionality constant that depends on the properties of the fluids (e.g., mass density, kinematic viscosity, speed of sound, and the like) and on geometric parameters (e.g., distance between the source of the leak and the location of the hydrophone(s) on the downhole acoustic tool, thickness of the wall containing the leak, and any combination thereof. This relation assumes that the mechanism that dominates the sound generation is the fluctuating turbulent shear stress on and/or near the leak opening. Traditionally, these results have been combined to express the sound pressure amplitude as linearly proportional to the flow power, according to Equation (4):

$$p' = C \Delta p Q \qquad \text{Equation (4)}$$

Where the constant C appropriately combines $C_f$ of Formula I and $C_a$ of Formula II as shown in Equation (5):

$$C = \frac{C_a}{C_f} \sqrt{\frac{\rho}{2}} \qquad \text{Equation (5)}$$

The advantage of the traditional model represented by Equations (1)-(4) is that the volumetric flow rate of a leak can be determined by measuring the sound pressure amplitude when the pressure differential across the leak and the constant C is known based on measurements or calibration using experimental data. However, the traditional model represented by Equations (1)-(4) is a simplified model that may not hold in situations when other mechanisms dominate the sound generation, such as unsteady mass flow, volumetric turbulence, cavitation (bubble formation), resulting two-phase gas-liquid flow, and any combination thereof. The methods of the present disclosure are based on an implicit generalization of Equation (4) to apply to situations when multiple mechanisms of sound generation are in effect:

$$p' = C_1 p^* Q^* + C_2 (p^*)^{3/2} Q^* + C_3 (p^*)^2 Q^* + C_4 (p^* - 1) Q^* + C_5 (p^*)^{3/4} Q^* + C_6 (p)^n Q^* + C_7 (p^*)^r (p')^s Q^* \qquad \text{Equation (6)}$$

Here, the symbol p* refers to a function of fluid pressures, and the symbol Q* refers to a function of fluid flow rate, as explained further. In the case of liquid-to-liquid leaks and in the case of liquid-to-gas leaks, p* is the pressure differential and is given by Equation (7):

$$p^* = p_0 - p_\infty \qquad \text{Equation (7)}$$

where the symbols $p_0$ and $p_\infty$ are as defined in Table 1. In the case of gas-to-liquid leaks and in the case of gas-to-gas leaks, p* is given by Equation (8):

$$p^* = \frac{2}{(k-1)} \left[ \left(\frac{p_0}{p_\infty}\right)^{\frac{k-1}{k}} - 1 \right] \qquad \text{Equation (8)}$$

where the symbols $p_0$, $p_\infty$ and k are as defined in Table 1. In the case of liquid-to-liquid leaks and in the case of liquid-to-gas leaks, Q* is given by Equation (9):

$$Q^* = \frac{Q}{\sqrt{p_0 - p_\infty}} \qquad \text{Equation (9)}$$

where the symbols Q, $p_0$ and $p_\infty$ are as defined in Table 1. In the case of gas-to-liquid leaks and in the case of gas-to-gas leaks, Q* is given by Equation (10):

$$Q^* = \frac{\dot{m} p_\infty}{p_0} \qquad \text{Equation (10)}$$

where the symbols $p_0$, $p_\infty$ and $\dot{m}$ are as defined in Table 1.

In equation (6), the term $C_1 p^* Q^*$ represents the sound generated due to the fluctuation of mass flow rate through the leak; the term $C_2 (p^*)^{3/2} Q^*$ represents the sound generated due to the fluctuation of shear stress across the leak exit (Equation (4)); the term $C_3 (p^*)^2 Q^*$ represents the turbulent mixing of fluids after the leaking fluid exits the leak; the term $C_4 (p^* - 1) Q^*$ represents the broad-banded shock associated noise; the term $C_5 s(p^*)^{3/4} Q^*$ represents the sound generated due to leak geometry such as a thin orifice with a sharp edge; $C_6 (p^*)^n Q^*$ represents the sound generated due to specific leak geometry and/or specific phenomena such as cavitation; the term $C_7 (p^*)^r (p')^s Q^*$ represent empirical correction that is added to improve the fidelity and/or accuracy of the flow rate prediction. We further define the relation between the area of the leak and the flow rate using equation (11) and equation (12). In the case of liquid-to-liquid leaks and in the case of liquid-to-gas leaks, the area of the leak A is related to the volumetric flow rate by Equation (11):

$$A = \frac{Q}{\lambda\sqrt{p_0 - p_\infty}} \quad \text{Equation (11)}$$

where $\lambda$ is a constant that depends on the physical properties of the liquid, such as density, viscosity, etc., and on the geometry of the leak, and the symbols Q, $p_0$ and $p_\infty$ are as defined in Table 1. In the case of gas-to-liquid leaks and in the case of gas-to-gas leaks, the area of the leak A is related to the mass flow rate by Equation (12):

$$A = \frac{\dot{m}}{\lambda p_0} \quad \text{Equation (12)}$$

where $\lambda$ is a constant that depends on the physical properties of the gas, such as density, heat capacity ratio, etc., and on the geometry of the leak, and the symbols $p_0$ and $\dot{m}$ are as defined in Table 1. The constants $C_1$, $C_2$, $C_3$, $C_4$, $C_5$, $C_6$, $C_7$, $\lambda$, n, r, and s are calibrated from experimentally obtained data, numerical computations, or a combination thereof. One method to determine these constants experimentally is to conduct experiments where only one of the sound generating mechanisms dominate. In such an experiment, a controlled leak of known area and known volumetric/mass flow rate is introduced between two regions each at separate but known fluid pressures. The average amplitude of sound generated over time p' is measured in the experiment. By performing many such experiments, the model constants $C_1$, $C_2$, $C_3$, $C_4$, $C_5$, $C_6$, $C_7$, $\lambda$, n, r, and s can be determined by correlating the measured acoustic pressure amplitude p', and the known parameters of the function of pressure p* and function of flow rate Q*. Another non-limiting method is to use existing techniques of numerical computation to simulate experiments. Therein, instead of performing a physical experiment, a numerical simulation is performed using one of the standard methods that couple acoustics and fluid mechanics. Such simulations may be performed using commercial software or proprietary computational algorithms. These numerical simulations are performed in a manner identical to the experiments described above. A combination of data from physical experiments and outputs from numerical simulations may also be used to determine the constants $C_1$, $C_2$, $C_3$, $C_4$, $C_5$, $C_6$, $C_7$, $\lambda$, n, r, and s without departing from the scope of the present disclosure.

The methods of the present disclosure differently determine estimated acoustic leak, defined as follows. First, acoustic pressure is measured as a function of time for a specified period of time by the downhole acoustic tool at a downhole location. Thereafter, the acoustic pressure data is transmitted via the tool string to the surface in real-time or near real-time, and may also be stored using an electronic storage memory. The data is then broken up into multiple non-overlapping time windows that may or may not be of the same size. The windows are sufficiently large to include "all relevant frequency content," referring to the frequencies that are expected in a leak for the particular fluid(s) in question. As an example, for water leaks, it is expected that the frequency spectrum to be within the range of 100 Hertz to 1 Megahertz. The data may be broken up by use of the control system and may be one or more non-overlapping time windows. Thereafter, the acoustic pressure amplitude and frequency are determined based on the data for each window separately and the data is processed to remove any contributions of the tool itself by the use of a pre-characterized vibration response spectrum of the tool gathered from experimental vibration data or from simulations. Acoustic pressure amplitude p' is represented by the root mean square (RMS) or by other statistical quantities, such as the standard deviation, averaged over all time windows. In the case of liquid-to-liquid leaks and in the case of liquid-to-gas leaks, the volumetric flow rate Q is then determined according to Equation (13):

$$Q = \frac{p'\sqrt{p^*}}{\left(\begin{array}{c}C_1 p^* + C_2(p^*)^{3/2} + C_3(p^*)^2 + C_4(p^* - 1) + \\ C_5(p^*)^{3/4} + C_6(p^*)^n + C_7(p^*)^r(p')^s\end{array}\right)} \quad \text{Equation (13)}$$

In the case of gas-to-liquid leaks and in the case of gas-to-gas leaks, the mass flow rate $\dot{m}$ is then determined according to Equation (14):

$$\dot{m} = \frac{p_0}{p_\infty}\frac{p'}{\left(\begin{array}{c}C_1 p^* + C_2(p^*)^{3/2} + C_3(p^*)^2 + C_4(p^* - 1) + \\ C_5(p^*)^{3/4} + C_6(p^*)^n + C_7(p^*)^r(p')^s\end{array}\right)} \quad \text{Equation (14)}$$

Subsequently, in step 212, an area of the leak source is determined from the flow rate. In the case of liquid-to-liquid leaks and in the case of liquid-to-gas leaks, the area of the leak may further be estimated using Equation (11) based on the variables determined or included in Equations (13). In the case of gas-to-liquid leaks and in the case of gas-to-gas leaks, the area of the leak may further be estimated using Equation (12) based on the variables determined or included in Equations (14).

Next, in step 213, a representation of the leak source is generated using the determined flow rate and the area of the leak source. Subsequently, in step 214, the representation of the leak source is provided for display. In some aspects, the representation of the leak source indicates a pressure differential between domains of the subterranean formation 108.

Accordingly, the methods described herein permit an operator to determine the estimated volumetric flow rate for liquids and estimated mass flow rate for gases, as well as the estimated area of the leak. Traditional methods of determining volumetric or mass flow rate use a single term corresponding to a single physical noise-source mechanism to describe the relation between flow rate and acoustic amplitude, with the underlying assumption that the changes in the shear stresses at the leak exit dominates the sound generation. The present disclosure takes into account multiple distinct terms to relate the flow rate and the acoustic amplitude, each of which represent different mechanisms of sound generation. Specifically, the present disclosure takes into account the fluctuation of mass flow rate through the leak, fluctuation of shear stresses across the leak exit, turbulent mixing of the fluids after the leaking fluid exits the leak, and noise-source efficiency effects of the specific geometry of the leak. Inclusion of the combination of these terms contributes to increase accuracy and robustness in predicting volumetric flow rates of leaks in a downhole environment, according to the present disclosure. Moreover, removal of acoustic noise contributed by the downhole acoustic tool itself further increases accuracy and robustness of the instant methods.

Indeed, the downhole acoustic tools of the present disclosure in combination with the methods described herein have a success rate of greater than 90% for predicting volumetric flow rate, with an error rate of ±50%. Traditional means have an error rate of −50% to +100%. Accordingly, the methods described herein improve prediction success rate, as well as prediction error rate with the addition of new data to calibrate the model constants, as described above.

In some implementations, the present disclosure provides a downhole acoustic tool comprising a mandrel and at least one hydrophone, wherein the downhole acoustic tool is coupled to a tool string for conveyance into a subterranean formation (e.g., a wellbore) at a downhole location. The downhole acoustic tool may be coupled to the tool string electrically, mechanically, and any combination thereof. In some embodiments, the present disclosure provides a method of introducing such a downhole acoustic tool into a subterranean formation (e.g., a wellbore), activating the at least one hydrophone of the downhole acoustic tool at a downhole location, receiving acoustic pressure as a function of time by at least one hydrophone, transmitting the acoustic pressure data to a surface location via the tool string, and calculating the flow rate of a leak therein based on measured acoustic pressure. The flow rate based on measured acoustic pressure is determined based on Equation (13) in the case of liquid-to-liquid leaks and liquid-to-gas leaks, and based on Equation (14) in the case of gas-to-liquid leaks and gas-to-gas leaks. The leak area is determined using Equation (11)) in the case of liquid-to-liquid leaks and liquid-to-gas leaks, and using Equation (12) in the case of gas-to-liquid leaks and gas-to-gas leaks. Specifically, the measured acoustic pressure data is broken up into one or more non-overlapping time windows that are sufficiently large to include all relevant frequency content, acoustic pressure amplitude and frequency are measured for each window, the sound contributed by the tool is removed, data from each window is then averaged and the RMS value determined. Thereafter, the data is used as parameters in Equations (13) and/or (14), as necessary. The estimated volumetric and/or mass flow rate may be used to determine the area of the leak based on Equations (11) and/or (12), as necessary.

In some aspects, the model constants employed in the prediction of the leak flow rates may be corrected for the operating temperature. The models stated above are used based on whether the leaking fluid is a liquid or a gas. However, the model constants may change depending on (a) whether the stationary fluid is a liquid or a gas, and, (b) whether the stationary fluid (e.g., Fluid B of FIG. 1) is the same as the leaking fluid (e.g., Fluid B of FIG. 1).

In one or more implementations, the model that predicts the flow rate (e.g., mass or volumetric) remains that same. However, the prediction accuracy may improve by using different model constants (or coefficients) for different ranges of measured acoustic pressure. In a first example, if the RMS value of the acoustic pressure is in a first range of values (e.g., p' is less than or equal to 10 Pa), then the model applies a first set of coefficients. In a second example, if the RMS value of the acoustic pressure is in a second range of values (e.g., p' is between 10 Pa and 20 Pa), then the model applies a second set of coefficients. In a third example, if the RMS value of the acoustic pressure is in a third range of values (e.g., p' is more than 20 Pa), then the model applies a third set of coefficients.

Figure 3:
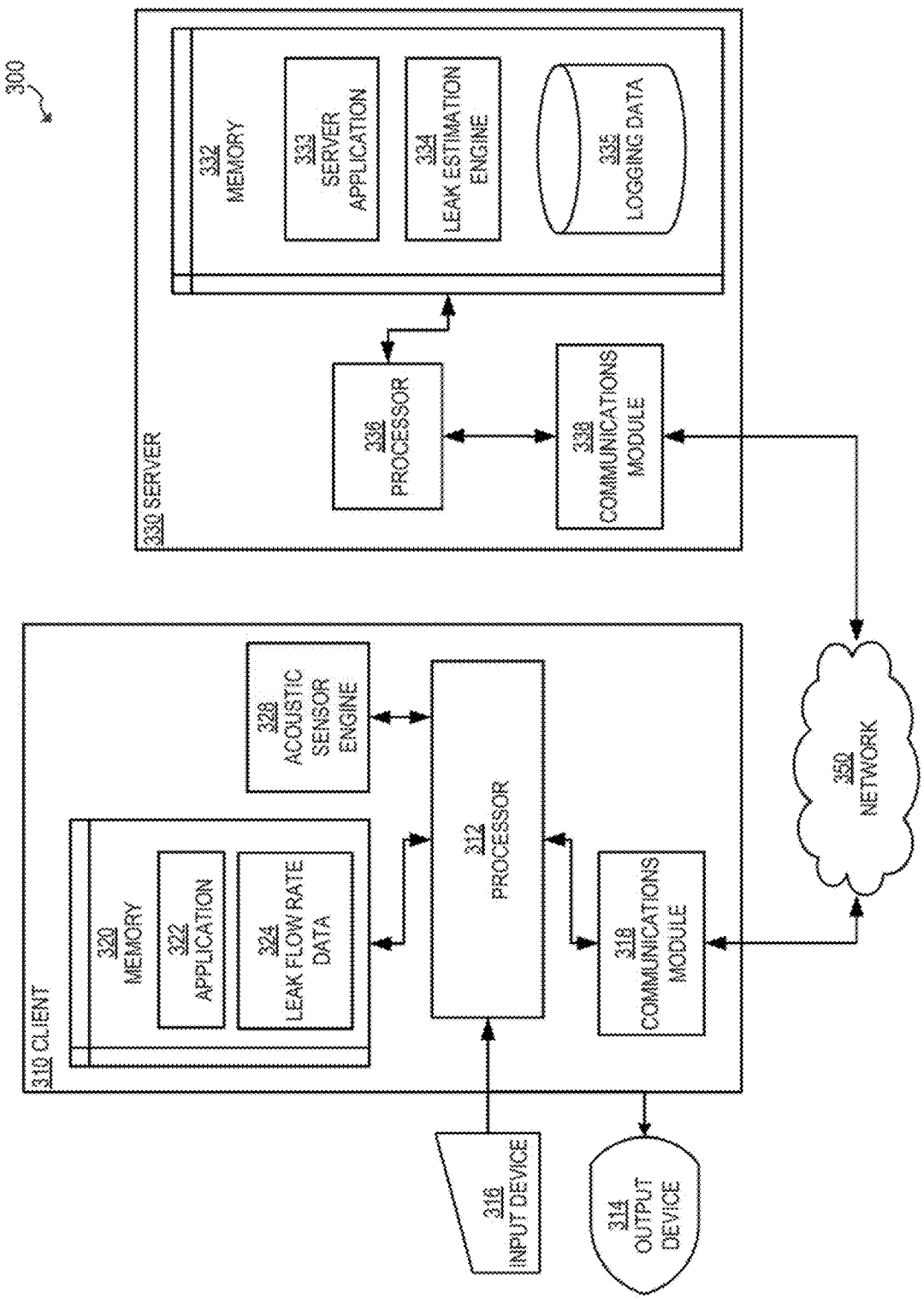
FIG. 3 is a block diagram illustrating the example logging device and server according to certain aspects of the disclosure.

FIG. 3 is a block diagram 300 illustrating an example server 330 and client 310 according to certain aspects of the disclosure. The client 310 may represent the logging tool 620 of FIG. 6 and the server 330 may represent the processor 538 of FIG. 5 in some implementations, or the client 310 may represent the processor 538 and the server 330 may represent an off-site computing facilities in other implementations.

The client 310 and the server 330 are connected over the network 350 via respective communications modules 318 and 338. The communications modules 318 and 338 are configured to interface with the network 350 to send and receive information, such as data, requests, responses, and commands to other devices on the network. The communications modules 318 and 338 can be, for example, modems or Ethernet cards.

The server 330 includes a memory 332, a processor 336, and a communications module 338. The processor 336 of the server 330 is configured to execute instructions, such as instructions physically coded into the processor 336, instructions received from software in the memory 332, or a combination of both. The memory 332 of the server 330 includes a server application 333 and a leak estimation engine 334. The processor 336 of the server 330 executes instructions from the server application 333 causing the processor 336, using the leak estimation engine 334, to process acoustic sensing signals received from the client 310 over the network 350 in order to determine flow rates for liquid leaks and/or gas leaks and the leak area. The memory 332 also includes logging data 335. The logging data 335 may include the logging measurements received from the client 310 over the network 350. In some aspects, the server 330 may post-process the measured acoustic signals that may be stored in the logging data 335.

The client 310 includes a processor 312, the communications module 318, and the memory 320 that includes an application 322. The client 310 also includes an acoustic sensor engine 328. The application 322 may be an acoustic sensing analysis tool, or physically coded instructions that execute a real-time analysis of acoustic signal measurements from the acoustic sensor in order to predict flow rates of fluid leaks and/or gas leaks associated with a leak source observed in the subterranean formation. The client 310 also includes an input device 316, such as a keyboard, mouse, touchscreen and/or game controller, and an output device 314, such as a display. The memory 320 also includes leak flow rate data 324. The leak flow rate data 324 may be a data structure containing models for performing either a liquid phase calculation or a gas phase calculation in order to predict flow rates and the leak area of the subject leak source. The leak flow rate data 324 may include the algorithms employed by each of the models (e.g., liquid phase, gas phase), and may be synchronized with the logging data 335 of the server 330. In some aspects, the processor 312 receives user input via the input device 316, where the user input may indicate the type of leak being measured such that the proper model constants (or coefficients) are being applied to determine the applicable flow rates.

The processor 312 of the client 310 is configured to execute instructions, such as instructions physically coded into the processor 312, instructions received from software in the memory 320, or a combination of both. In some implementations, the processor 312 of the client 310 executes instructions from the application 322 causing the processor 312 to run a process that predicts flow rates for fluid leaks and/or gas leaks as well as the leak area.

The wellbore may be drilled for different depth zones. In some aspects, the acoustic pressure data is obtained from each of the different depth zones. In operation, the client 310 may transmit the collected acoustic pressure data to the server 330 (e.g., at the surface) over the network 350. In some aspects, the acoustic pressure data is transmitted to the server 330 over predetermined intervals. Upon receiving the acoustic pressure data from the client 110, the processor 336, using the server application 333 and the leak estimation engine 334, parses the acoustic pressure data into multiple data segments, where each of data segments corresponds to one of multiple non-overlapping time windows of a specified time period being measured.

The processor 336, using the server application 333, applies a digital filter to the acoustic pressure data as a function of frequency such that signal contributions corresponding to the downhole acoustic sensor are removed from each of the data segments of the acoustic pressure data. The processor 336, using the server application 333 and the leak estimation engine 334, then applies a Fourier transform to an acoustic pressure data segment for each corresponding non-overlapping time window. From the Fourier transform calculation, the processor 336, using the leak estimation engine 334, obtains a phase component, an amplitude component and a frequency component of the acoustic pressure data segment.

The leak estimation engine 334 can then average the acoustic pressure data from different windows of the non-overlapping time windows. The processor 336, using the leak estimation engine 334, determines a root mean square value from the averaged acoustic pressure data.

The processor 336, using the server application 333 and the leak estimation engine 334, determines a flow rate of the leak source (e.g., volumetric or mass) using the averaged acoustic pressure data. In some aspects, the flow rate is determined based on the root mean square value.

The processor 336, using the leak estimation engine 334, determines whether the leak source is in a first domain or a second domain of a subterranean formation. The flow rate of the leak source is determined using a first set of terms when it is determined that the leak source is in the first domain (e.g., liquid-based region). The flow rate of the leak source is determined using a second set of terms when it is determined that the leak source is in the second domain (e.g., gas-based region). In some aspects, the first domain represents a liquid-to-liquid domain, and each term includes a same pressure differential value. In some aspects, the second domain represents a gas-to-gas domain, and each term is a function of a pressure differential value.

In some aspects, each of the terms in first and second sets of terms represents different sources of sound generation, where each source of sound generation corresponds to a different predetermined coefficient. In some aspects, the first and second sets of terms include a first term indicating a fluctuation of mass flow rate through the leak source, a second term indicating a fluctuation of shear stresses through the leak source, a third term indicating a mixing of fluids after a leaking fluid exits the leak source, and a fourth term indicating a noise-source efficiency effect of a specific geometry of the leak source.

The processor 336, using the server application 333 and the leak estimation engine 334, determines an area of the leak source from the flow rate of the leak source. The processor 336, using the server application 333, then generates a representation of the leak source using the flow rate and the area of the leak source. The representation of the leak source may be provided for display at the surface via a remote display (not shown), or may be transmitted back to the client 310 over the network 350 for display via the output device 314, depending on implementation. The representation of the leak source may provide a visual indication of the flow rate and leak area within the subterranean formation or wellbore.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
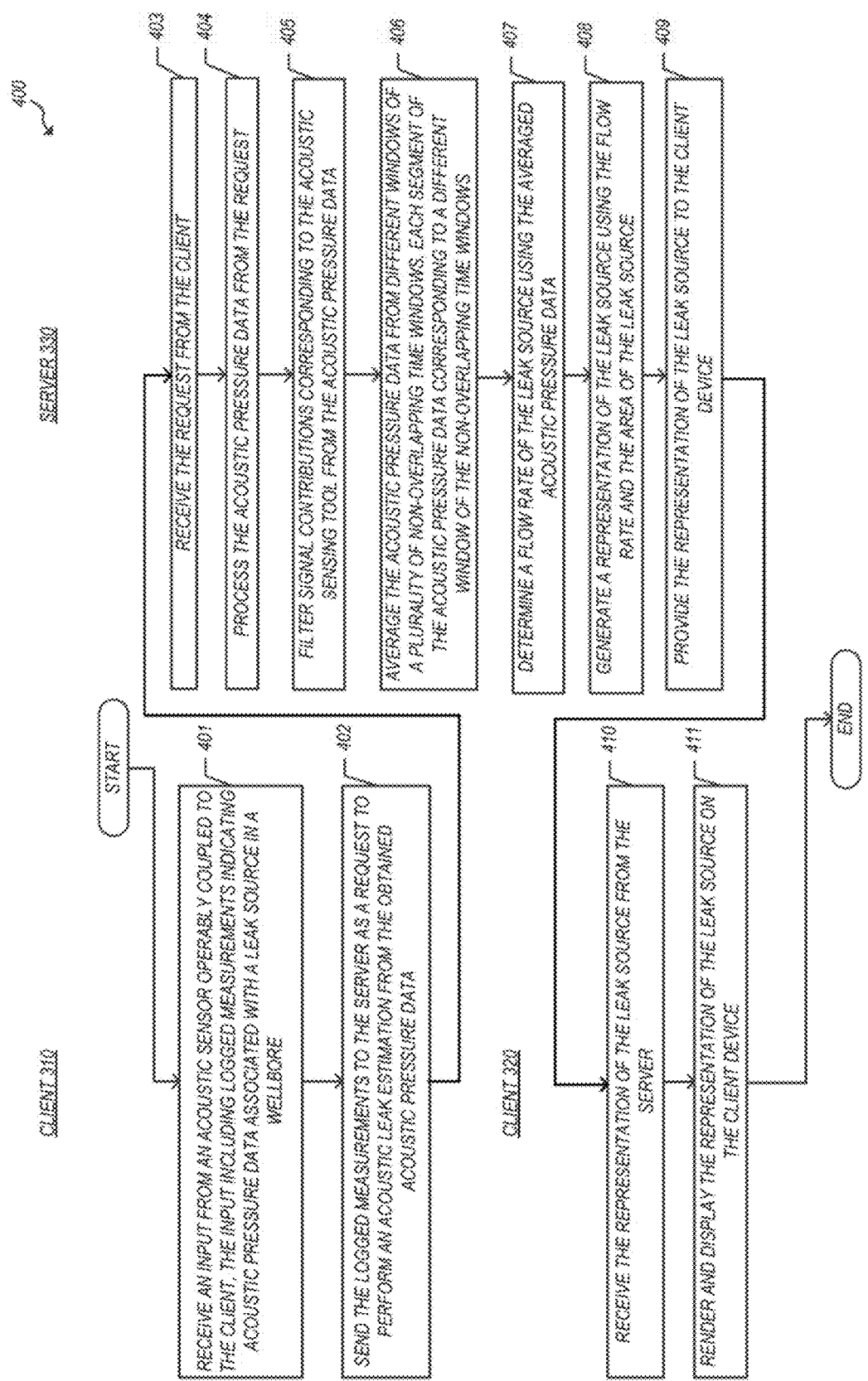
FIG. 4 illustrates an example process of an acoustics based estimation of flow rates using the example client and server implementing the methods and processes described herein.

FIG. 4 illustrates an example process of an acoustics based estimation of flow rates using the example client and server implementing the methods and processes described herein. For explanatory purposes, the example process 400 is described herein with reference to the processor 538 of FIG. 5; however, the example process 400 is not limited to the processor 538 of FIG. 5, and one or more blocks of the example process 400 may be performed by one or more other components of the processor 538. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed.

Figure 5:
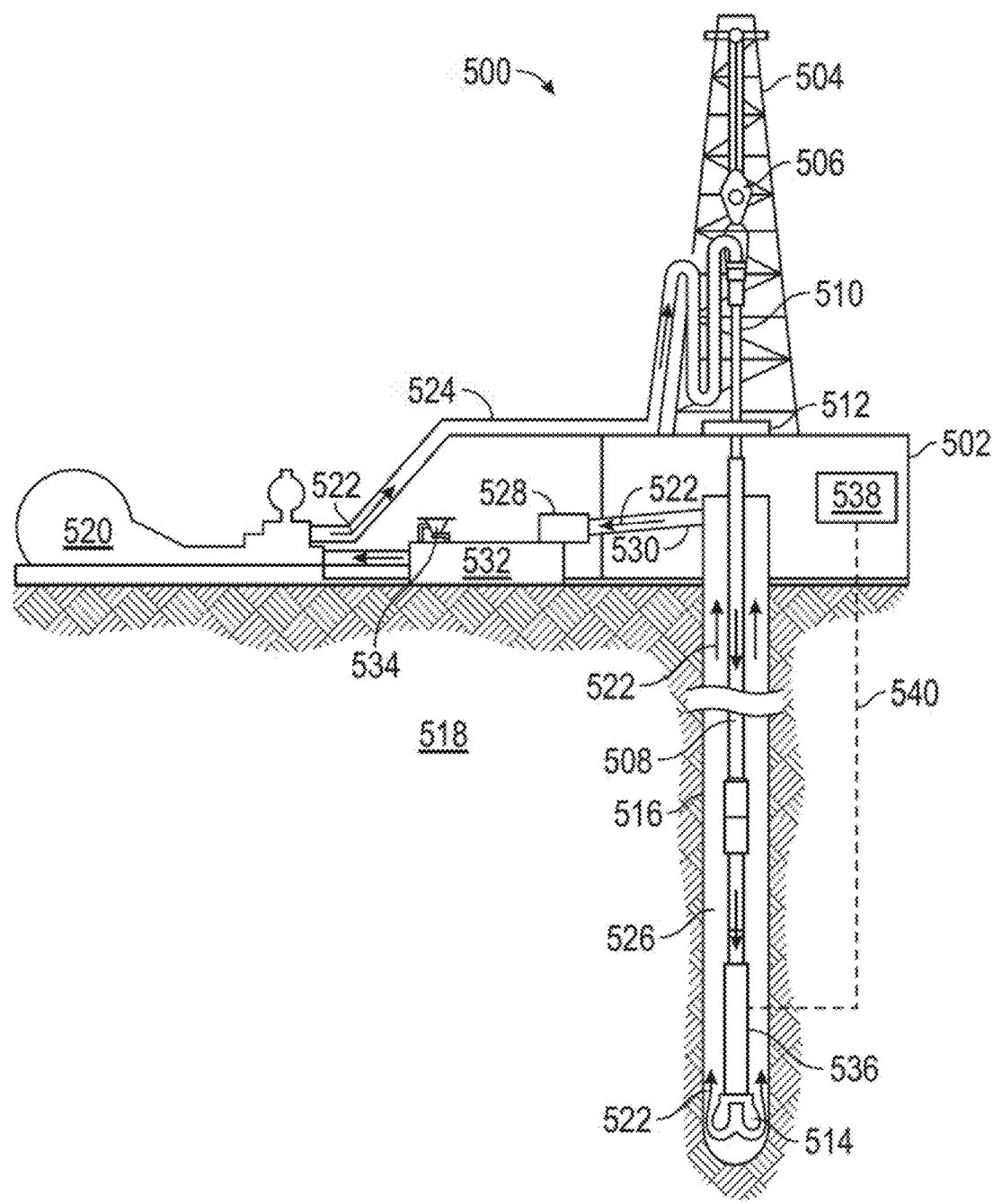
FIG. 5 illustrates an exemplary drilling assembly for implementing the processes described herein.

FIG. 5 illustrates an exemplary drilling assembly 500 for implementing the logging analysis methods described herein. It should be noted that while FIG. 5 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 500 may include a drilling platform 502 that supports a derrick 504 having a traveling block 506 for raising and lowering a drill string 508. The drill string 508 may include, but is not limited to, drill pipe and coiled tubing, as generally known to those skilled in the art. A kelly 510 supports the drill string 508 as it is lowered through a rotary table 512. A drill bit 514 is attached to the distal end of the drill string 508 and is driven either by a downhole motor and/or via rotation of the drill string 508 from the well surface. As the bit 514 rotates, it creates the wellbore 516 that penetrates various subterranean formations 518. The drilling platform 502 may be a drilling rig, a completion rig, a workover rig, or the like. In some implementations, the drilling platform 502 may be omitted and replaced with a standard surface wellhead completion or installation, without departing from the scope of the disclosure.

A pump 520 (e.g., a mud pump) circulates drilling mud 522 through a feed pipe 524 and to the kelly 510, which conveys the drilling mud 522 downhole through the interior of the drill string 508 and through one or more orifices in the drill bit 514. The drilling mud 522 is then circulated back to the surface via an annulus 526 defined between the drill string 508 and the walls of the wellbore 516. At the surface, the recirculated or spent drilling mud 522 exits the annulus 526 and may be conveyed to one or more fluid processing unit(s) 528 via an interconnecting flow line 530. After passing through the fluid processing unit(s) 528, a "cleaned" drilling mud 522 is deposited into a nearby retention pit 532 (i.e., a mud pit). While illustrated as being arranged at the outlet of the wellbore 516 via the annulus 526, those skilled in the art will readily appreciate that the fluid processing unit(s) 528 may be arranged at any other location in the drilling assembly 500 to facilitate its proper function, without departing from the scope of the scope of the disclosure.

Chemicals, fluids, additives, and the like may be added to the drilling mud 522 via a mixing hopper 534 communicably coupled to or otherwise in fluid communication with the retention pit 532. The mixing hopper 534 may include, but is not limited to, mixers and related mixing equipment known to those skilled in the art. In other implementations, however, the chemicals, fluids, additives, and the like may be added to the drilling mud 522 at any other location in the drilling assembly 500. In at least one implementation, for example, there may be more than one retention pit 532, such as multiple retention pits 532 in series. Moreover, the retention pit 532 may be representative of one or more fluid storage facilities and/or units where the chemicals, fluids, additives, and the like may be stored, reconditioned, and/or regulated until added to the drilling mud 522.

The processor 538 may be a portion of computer hardware used to implement the various illustrative blocks, modules, elements, components, methods, and algorithms described herein. The processor 538 may be configured to execute one or more sequences of instructions, programming stances, or code stored on a non-transitory, computer-readable medium. The processor 538 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some implementations, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMs, DVDs, or any other like suitable storage device or medium.

Executable sequences described herein can be implemented with one or more sequences of code contained in a memory. In some implementations, such code can be read into the memory from another machine-readable medium. Execution of the sequences of instructions contained in the memory can cause a processor 538 to perform the process steps described herein. One or more processors 538 in a multi-processing arrangement can also be employed to execute instruction sequences in the memory. In addition, hard-wired circuitry can be used in place of or in combination with software instructions to implement various implementations described herein. Thus, the present implementations are not limited to any specific combination of hardware and/or software.

As used herein, a machine-readable medium will refer to any medium that directly or indirectly provides instructions to the processor 538 for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

The drilling assembly 500 may further include a bottom hole assembly (BHA) coupled to the drill string 508 near the drill bit 514. The BHA may comprise various downhole measurement tools such as, but not limited to, measurement-while-drilling (MWD) and logging-while-drilling (LWD) tools, which may be configured to take downhole measurements of the surrounding subterranean formations 518. Along the drill string 508, logging while drilling (LWD) or measurement while drilling (MWD) equipment 536 is included. In one or more implementations, the drilling assembly 500 involves drilling the wellbore 516 while the logging measurements are made with the LWD/MWD equipment 536. More generally, the methods described herein involve introducing a logging tool into the wellbore where the logging tool may be an LWD logging tool, a MWD logging tool, a wireline logging tool, slickline logging tool, and the like.

According to the present disclosure, the LWD/MWD equipment 536 may include an acoustic sensor or a set of acoustic sensors used to detect the flow of fluid flowing into and/or adjacent the wellbore 516. The acoustic sensor may be conveyed downhole to a target location (not shown) within the wellbore 516. At the target location, the acoustic sensor may be activated or "turned on" collect acoustic sound pressure as a function of time within the wellbore 516. As used herein, the term "acoustic sound pressure" refers to local pressure fluctuation from the ambient (equilibrium) pressure, caused by a sound wave, from which acoustic amplitude and frequency can be calculated using Fourier transform.

In an example, the acoustic sensor may be arranged about the longitudinal axis of the LWD/MWD equipment 536, and, thus, of the wellbore 516 at a predetermined fixed location within the wellbore 516. In some aspects, the acoustic sensors may be configured to move along the longitudinal axis of the wellbore 516. However, the arrangement of the acoustic sensors is not limited thereto and the acoustic sensors may be arranged in any configuration as required by the application and design.

The LWD/MWD equipment 536 may transmit the measured data to a processor 538 at the surface wired or wirelessly. Transmission of the data is generally illustrated at line 540 to demonstrate communicable coupling between the processor 538 and the LWD/MWD equipment 536 and does not necessarily indicate the path to which communication is achieved. The acoustic sensor may be communicably coupled to the line 540 used to transfer measurements and signals from the BHA to the processor 538 that processes the acoustic measurements and signals received by the acoustic sensor and/or controls the operation of the BHA.

In the subject technology, the LWD/MWD equipment 536 may be capable of logging analysis of the subterranean formation 518 proximal to the wellbore 516. The example process 400 begins, at step 401, where the LWD/MWD equipment 536 receives an input from an acoustic sensor operably coupled to the LWD/MWD equipment 536. In step 402 of the process 400, the LWD/MWD equipment 536 sends the logged measurements to the processor 538 as a request to perform an acoustic leak estimation from the obtained acoustic pressure data. At step 403, the processor 538 receives the request from the LWD/MWD equipment 536, and, at step 404, processes the acoustic pressure data from the request. At step 405, the processor 538 filters signal contributions corresponding to the LWD/MWD equipment 536 from the acoustic pressure data. Next, in step 406, the processor 538 averages the acoustic pressure data from different windows of a plurality of non-overlapping time windows, where each segment of the acoustic pressure data corresponds to a different window of the non-overlapping time windows. Subsequently, in step 407, the processor 538 determines a flow rate of the leak source using the averaged acoustic pressure data. In some aspects, calculating the flow rate may differ depending on whether the leak source originates in a liquid-to-liquid domain or a gas-to-gas domain. Next, in step 408, the processor 538 generates a representation of the leak source using the flow rate and the area of the leak source. Subsequently, in step 409, the processor 538 provides the representation of the leak source to a client device (not shown). In some aspects, the client device may be a terminal with a display that is located on-site with the drilling assembly 500. In other aspects, the client device may be an off-site terminal for displaying a visual representation of logged measurements remote from the location of the drilling assembly 500. In some aspects, at step 410, the client device receives the representation of the leak source from the processor 538. Subsequently, in step 411, the client device renders and displays the representation of the leak source for evaluation of the integrity of downhole tools and/or equipment positioned in the wellbore 516.

In some implementations, part of the processing may be performed by a telemetry module (not shown) in combination with the processor 538. For example, the telemetry module may pre-process the individual sensor signals (e.g., through signal conditioning, filtering, and/or noise cancellation) and transmit them to a surface data processing system (e.g., the processor 538) for further processing, where the leak probability map is computed, and any flow-induced acoustic sources are detected and localized based thereon. In at least one implementation, the processor 538 may be configured to provide acoustic logs of the entire length of the wellbore 516 to provide a leak probability map of the flow of fluids and/or gas in the wellbore 516.

In various implementations, the processed acoustic signals are evaluated in conjunction with measurements from other sensors (e.g., temperature and surface well pressure measurements) to evaluate flow conditions and overall well integrity. The telemetry module may encompass any known means of downhole communication including, but not limited to, a mud pulse telemetry system, an acoustic telemetry system, a wired communications system, a wireless communications system, or any combination thereof. In certain implementations, some or all of the measurements taken by the acoustic sensor may also be stored within a memory associated with the acoustic sensors or the telemetry module for later retrieval at the surface upon retracting the drill string 508.

It will be appreciated by those skilled in the art that even though FIG. 5 depicts the LWD/MWD equipment 536 as being arranged and operating in the vertical portion of the wellbore 516, the implementations described herein are equally applicable for use in portions of the wellbore 516 that are horizontal, deviated, or otherwise slanted. Moreover, use of directional terms such as above, below, upper, lower, upward, downward, uphole, downhole, and the like are used in relation to the illustrative implementations as they are depicted in the figures, the upward or uphole direction being toward the top of the corresponding figure and the downward direction being toward the bottom of the corresponding figure, the uphole direction being toward the surface of the well and the downhole direction being toward the toe of the well.

Figure 6:
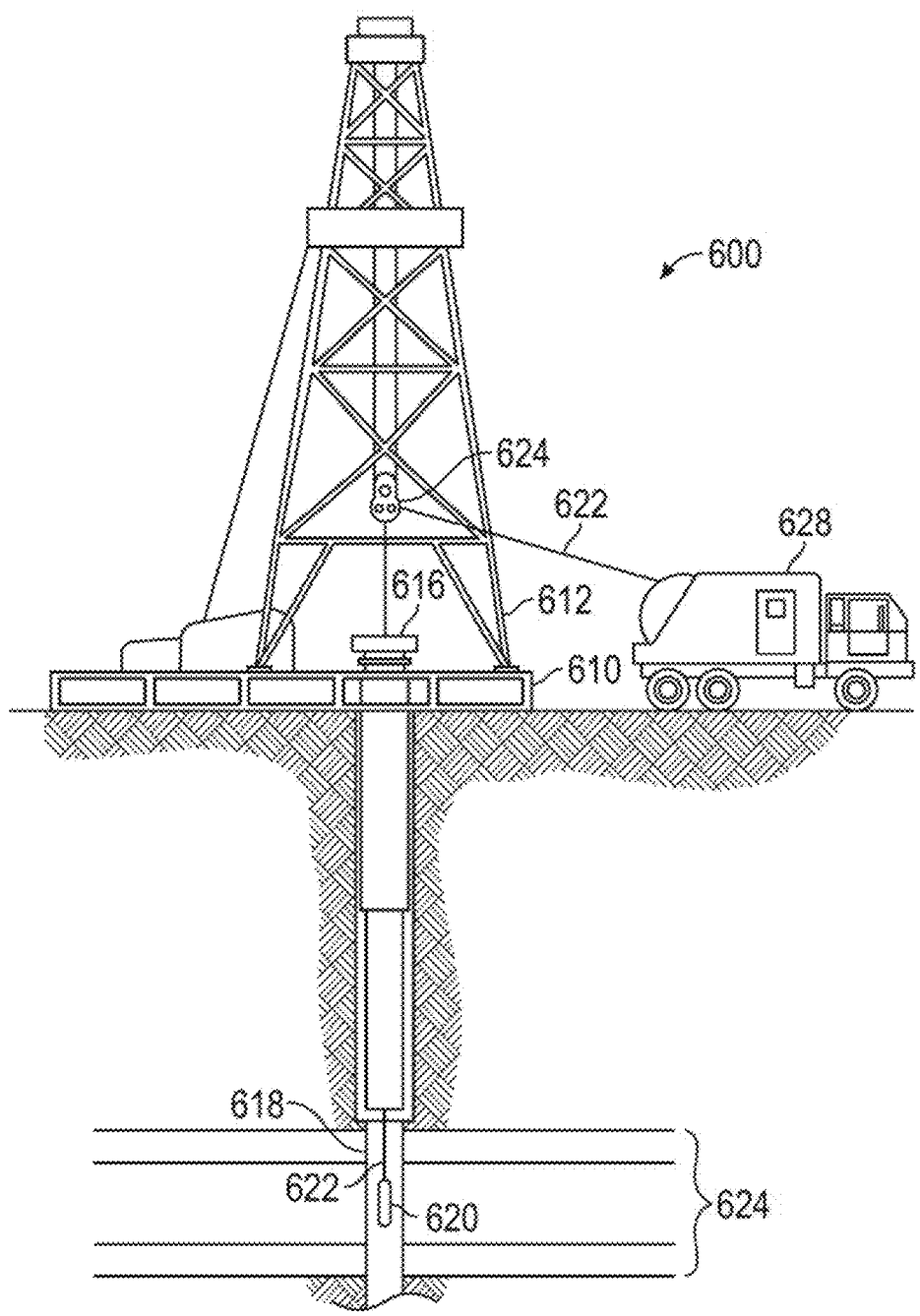
FIG. 6 illustrates a wireline system suitable for implementing the processes described herein.

FIG. 6 illustrates a logging assembly 600 having a wireline system suitable for implementing the logging analysis methods described herein. As illustrated, a platform 610 may be equipped with a derrick 612 that supports a hoist 614. Drilling oil and gas wells, for example, are commonly carried out using a string of drill pipes connected together so as to form a drilling string that is lowered through a rotary table 616 into a wellbore 618. Here, it is assumed that the drilling string has been temporarily removed from the wellbore 618 to allow a logging tool 620 to be lowered by wireline 622, slickline, or logging other cable into the wellbore 618. Typically, the logging tool 620 is lowered to a region of interest and subsequently pulled upward at a substantially constant speed. During the upward trip, instruments included in the logging tool 620 may be used to perform measurements on the subterranean formation 624 adjacent the wellbore 618 as the logging tool 620 passes by.

The logging tool 620 may include one or more wireline instrument(s) that may be suspended into the wellbore 618 by the wireline 622. The wireline instrument(s) may include an acoustic sensor or a group of acoustic sensors, which may be communicably coupled to the wireline 622. The wireline 622 may include conductors for transporting power to the wireline instrument and also facilitate communication between the surface and the wireline instrument.

The acoustic sensors may include electronic sensors, such as hydrophones, piezoelectric sensors, piezoresistive sensors, electromagnetic sensors, accelerometers, or the like. In other implementations, the acoustic sensors may comprise fiber optic sensors, such as point sensors (e.g., fiber Bragg gratings, etc.) distributed at desired or predetermined locations along the length of an optical fiber. In yet other implementations, the acoustic sensors may comprise distributed acoustic sensors, which may also use optical fibers and permit a distributed measurement of local acoustics at any given point along the fiber. In still other implementations, the acoustic sensors may include optical accelerometers or optical hydrophones that have fiber optic cablings.

Additionally or alternatively, in an example (not explicitly illustrated), the acoustic sensors may be attached to or embedded within the one or more strings of casing lining the wellbore 618 and/or the wall of the wellbore 618 at an axially spaced pre-determined distance.

A logging facility 628, shown in FIG. 6 as a truck, may collect measurements from the acoustic sensors, and may include the processor 538 for controlling, processing, storing, and/or visualizing the measurements gathered by the acoustic sensors. The processor 538 may be communicably coupled to the wireline instrument(s) by way of the wireline 622. Alternatively, the measurements gathered by the logging tool 620 may be transmitted (wired or wirelessly) or physically delivered to computing facilities off-site where the methods and processes described herein may be implemented.

Figure 7:
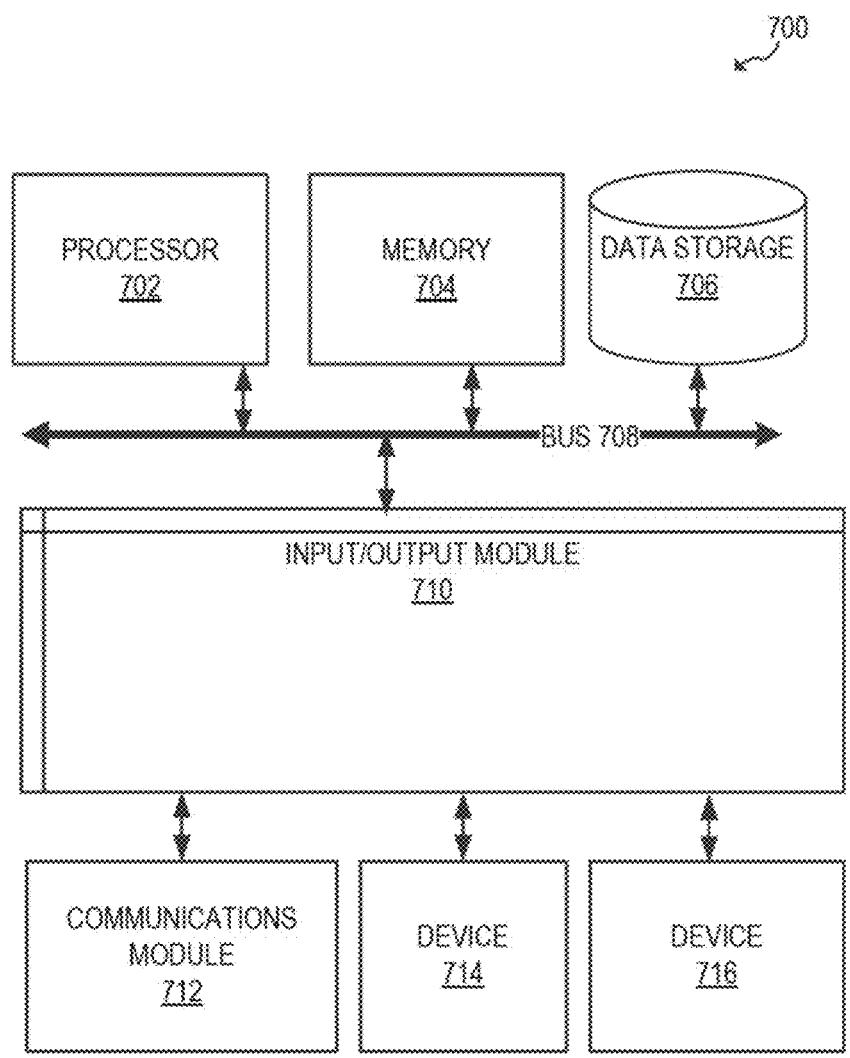
FIG. 7 is a block diagram illustrating an example computer system with which the client of FIG. 3 can be implemented.

FIG. 7 is a block diagram illustrating an exemplary computer system 700 with which the client 310 and server 330 of FIG. 3 can be implemented. In certain aspects, the computer system 700 may be implemented using hardware or a combination of software and hardware, either in a dedicated server, integrated into another entity, or distributed across multiple entities.

Computer system 700 (e.g., client 310 and server 330) includes a bus 708 or other communication mechanism for communicating information, and a processor 702 (e.g., processor 312 and 336) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 320 and 332), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 (e.g., communications modules 318 and 338) include networking interface cards, such as Ethernet cards and modems. In certain aspects, the input/output module 710 is configured to connect to a plurality of devices, such as an input device 714 (e.g., input device 316) and/or an output device 716 (e.g., output device 314). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as a LCD (liquid crystal display) monitor, for displaying information to the user.

According to one aspect of the present disclosure, the client 310 and server 330 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in the memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 350) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone such as a smartphone.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Various examples of aspects of the disclosure are described below. These are provided as examples, and do not limit the subject technology.

A method is provided that includes obtaining acoustic pressure data associated with a leak source in a wellbore using at least one acoustic sensor positioned in the wellbore. In some aspects, the acoustic pressure data is obtained as a function of time for a specified time period. The method includes parsing the acoustic pressure data into a plurality of data segments, each. In some aspects, each of the plurality of data segments corresponds to one of a plurality of non-overlapping time windows of the specified time period. The method also includes averaging the acoustic pressure data from different windows of the plurality of non-overlapping time windows. The method also includes determining a flow rate of the leak source using the averaged acoustic pressure data and an area of the leak source using the flow rate of the leak source. The method further includes generating a representation of the leak source using the flow rate and the area of the leak source.

In some aspects, the flow rate is determined using a plurality of terms representing different sources of sound generation. In other aspects, each of the plurality of terms includes a different predetermined coefficient.

In some aspects, the plurality of terms includes a first term indicating a fluctuation of mass flow rate through the leak source, a second term indicating a fluctuation of shear stresses through the leak source, a third term indicating a mixing of fluids after a leaking fluid exits the leak source, a fourth term indicating a broad-banded shock associated noise, a fifth term indicating a noise-source efficiency effect of thin orifices with sharp edges, a sixth term indicating a noise source efficiency for other specific geometry of the leak source, and a seventh term indicating an empirical correction to the determined flow rate.

In some aspects, the method includes determining whether the leak source is in a first domain or a second domain of a subterranean formation. The flow rate of the leak source is determined using a first set of terms of the plurality of terms when it is determined that the leak source is in the first domain. The flow rate of the leak source is determined using a second set of terms of the plurality of terms when it is determined that the leak source is in the second domain.

In some aspects, the first domain represents a liquid-to-liquid domain or a liquid-to-gas domain, and each term of the plurality of terms includes a same pressure differential value.

In some aspects, the second domain represents a gas-to-liquid domain or a gas-to-gas domain, and each term of the plurality of terms is a function of fluid pressures on either side of the leak source.

The method also includes providing, for transmission, the obtained acoustic pressure data to one or more processing devices at a surface. In some aspects, the acoustic pressure data is parsed by the one or more processing devices.

In some aspects, the obtained acoustic pressure data is transmitted to the surface over predetermined intervals.

The method also includes removing one or more signal contributions of the at least one acoustic sensor from the obtained acoustic pressure data. In some aspects, respective signal contributions of the at least one acoustic sensor are removed from each of the plurality of data segments.

In some aspects, removing the one or more signal contributions includes applying a digital filter to the acoustic pressure data. In some aspects, the one or more signal contributions of the at least one acoustic sensor are filtered by the applied digital filter as a function of frequency.

The method also includes for each of the plurality of non-overlapping time windows, applying a Fourier transform to at least a portion of the obtained acoustic pressure data that corresponds to the non-overlapping time window. The method also includes obtaining one or more of a phase component, an amplitude component and a frequency component of the obtained acoustic pressure data from the applied Fourier transform.

The method also includes determining a root mean square value from the averaged acoustic pressure data. In some aspects, the flow rate is determined based on the root mean square.

The method also includes drilling a wellbore penetrating a subterranean formation. In some aspects, the wellbore is drilled for a plurality of depth zones. In some aspects, the acoustic pressure data is obtained from each of the plurality of depth zones.

The method also includes logging the wellbore with an acoustic sensing tool that includes the at least one acoustic sensor. In some aspects, the acoustic pressure data is obtained using logged measurements from the acoustic sensing tool.

A non-transitory computer-readable storage medium including instructions that, when executed by a processor, cause the processor to perform a method. The method includes obtaining acoustic pressure data associated with a leak source in a wellbore using at least one acoustic sensor of an acoustic sensing tool positioned within the wellbore. In some aspects, the acoustic pressure data is obtained as a function of time for a specified time period. In some aspects, the acoustic pressure data includes a plurality of data segments that respectively correspond to one of a plurality of non-overlapping time windows of the specified time period. The method also includes filtering signal contributions corresponding to the acoustic sensing tool from the acoustic pressure data. The method also includes averaging the acoustic pressure data from different windows of the plurality of non-overlapping time windows. The method also includes determining a flow rate of the leak source using the averaged acoustic pressure data. In some aspects, the method includes determining an area of the leak source from the flow rate of the leak source. The method also includes generating a representation of the leak source using the flow rate and the area of the leak source.

The method also includes determining whether the leak source is in a liquid-to-liquid domain or a gas-to-gas domain of a subterranean formation. In some aspects, the flow rate of the leak source is determined using a first set of terms of a plurality of terms when it is determined that the leak source is in the liquid-to-liquid domain. In other aspects, the flow rate of the leak source is determined using a second set of terms of the plurality of terms when it is determined that the leak source is in the gas-to-gas domain.

In some aspects, the plurality of terms includes a first term indicating a fluctuation of mass flow rate through the leak source, a second term indicating a fluctuation of shear stresses through the leak source, a third term indicating a mixing of fluids after a leaking fluid exits the leak source, and a fourth term indicating a noise-source efficiency effect of a specific geometry of the leak source.

A system includes an acoustic sensing tool and one or more processors. The system also includes a non-transitory computer-readable medium coupled to the acoustic sensing tool to receive data from the acoustic sensing tool and encoded with instructions that, when executed by the one or more processors, cause the one or more processors to perform operations. The operations include obtaining, once the acoustic sensing tool is deployed into a wellbore, acoustic pressure data associated with a leak source in the wellbore using at least one acoustic sensor of the acoustic sensing tool. In some aspects, the acoustic pressure data is obtained as a function of time for a specified time period. In some aspects, the acoustic pressure data includes a plurality of data segments that respectively correspond to one of a plurality of non-overlapping time windows of the specified time period. The operations also include filtering signal contributions corresponding to the acoustic sensing tool from the acoustic pressure data. The operations also include averaging the acoustic pressure data from different windows of the plurality of non-overlapping time windows. The operations also include determining a flow rate of the leak source using the averaged acoustic pressure data and an area of the leak source using the flow rate of the leak source. The operations also include generating a representation of the leak source using the flow rate and the area of the leak source.

In some aspects, the flow rate is determined using a plurality of terms representing different sources of sound generation, where each of the plurality of terms includes a different predetermined coefficient. In some aspects, the plurality of terms includes a first term indicating a fluctuation of mass flow rate through the leak source, a second term indicating a fluctuation of shear stresses through the leak source, a third term indicating a mixing of fluids after a leaking fluid exits the leak source, and a fourth term indicating a noise-source efficiency effect of a specific geometry of the leak source.

The operations also include determining whether the leak source is in a first domain or a second domain of a subterranean formation. In some aspects, the flow rate of the leak source is determined using a first set of terms of the plurality of terms when it is determined that the leak source is in the first domain. In other aspects, the flow rate of the leak source is determined using a second set of terms of the plurality of terms when it is determined that the leak source is in the second domain.

In one or more aspects, examples of clauses are described below.

A method comprising one or more methods, operations or portions thereof described herein.

An apparatus comprising one or more memories and one or more processors (e.g., 710), the one or more processors configured to cause performing one or more methods, operations or portions thereof described herein.

An apparatus comprising one or more memories (e.g., 720, one or more internal, external or remote memories, or one or more registers) and one or more processors (e.g., 712) coupled to the one or more memories, the one or more processors configured to cause the apparatus to perform one or more methods, operations or portions thereof described herein.

An apparatus comprising means (e.g., 710) adapted for performing one or more methods, operations or portions thereof described herein.

A processor (e.g., 712) comprising modules for carrying out one or more methods, operations or portions thereof described herein.

A hardware apparatus comprising circuits (e.g., 710) configured to perform one or more methods, operations or portions thereof described herein.

An apparatus comprising means (e.g., 710) adapted for performing one or more methods, operations or portions thereof described herein.

An apparatus comprising components (e.g., 710) operable to carry out one or more methods, operations or portions thereof described herein.

A computer-readable storage medium (e.g., 720, one or more internal, external or remote memories, or one or more registers) comprising instructions stored therein, the instructions comprising code for performing one or more methods or operations described herein.

A computer-readable storage medium (e.g., 720, one or more internal, external or remote memories, or one or more registers) storing instructions that, when executed by one or more processors, cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method, comprising:
   drilling a wellbore penetrating a subterranean formation, the wellbore being drilled for a plurality of depth zones;
   obtaining acoustic pressure data associated with a leak source from each of the plurality of depth zones in the wellbore using at least one acoustic sensor positioned in the wellbore during the drilling operations, the acoustic pressure data being obtained as a function of time for a specified time period;
   parsing the acoustic pressure data into a plurality of data segments, each of the plurality of data segments corresponding to one of a plurality of non-overlapping time windows of the specified time period;
   averaging the acoustic pressure data from different windows of the plurality of non-overlapping time windows;
   determining a flow rate of the leak source using the averaged acoustic pressure data and an area of the leak source using the flow rate of the leak source, wherein the flow rate is determined using a plurality of terms representing different sources of sound generation, wherein each of the plurality of terms includes a different predetermined coefficient, and wherein the plurality of terms includes a first term indicating a fluctuation of mass flow rate through the leak source, a second term indicating a fluctuation of shear stresses through the leak source, a third term indicating a mixing of fluids after a leaking fluid exits the leak source, a fourth term indicating a broad-banded shock associated noise, a fifth term indicating a noise-source efficiency effect of thin orifices with sharp edges, a sixth term indicating a noise source efficiency for other specific geometry of the leak source, and a seventh term indicating an empirical correction to the determined flowrate; and
   generating a representation of the leak source using the flow rate and the area of the leak source.

2. The method of claim 1, further comprising:
   determining whether the leak source is in a first domain or a second domain of a subterranean formation,
   wherein the flow rate of the leak source is determined using a first set of terms of the plurality of terms when it is determined that the leak source is in the first domain,
   wherein the flow rate of the leak source is determined using a second set of terms of the plurality of terms when it is determined that the leak source is in the second domain.

3. The method of claim 2, wherein the first domain represents a liquid-to-liquid domain or a liquid-to-gas domain, and wherein each term of the plurality of terms includes a same pressure differential value.

4. The method of claim 2, wherein the second domain represents a gas-to-liquid domain or a gas-to-gas domain, and wherein each term of the plurality of terms is a function of fluid pressures on either side of the leak source.

5. The method of claim 1, further comprising:
   providing, for transmission, the obtained acoustic pressure data to one or more processing devices at a surface,
   wherein the acoustic pressure data is parsed by the one or more processing devices.

6. The method of claim 5, wherein the obtained acoustic pressure data is transmitted to the surface over predetermined intervals.

7. The method of claim 1, further comprising:
   removing one or more signal contributions of the at least one acoustic sensor from the obtained acoustic pressure data,
   wherein respective signal contributions of the at least one acoustic sensor are removed from each of the plurality of data segments.

8. The method of claim 7, wherein removing the one or more signal contributions comprises:
   applying a digital filter to the acoustic pressure data,
   wherein the one or more signal contributions of the at least one acoustic sensor are filtered by the applied digital filter as a function of frequency.

9. The method of claim 1, further comprising:
   for each of the plurality of non-overlapping time windows, applying a Fourier transform to at least a portion of the obtained acoustic pressure data that corresponds to the non-overlapping time window; and
   obtaining one or more of a phase component, an amplitude component and a frequency component of the obtained acoustic pressure data from the applied Fourier transform.

10. The method of claim 1, further comprising:
    determining a root mean square value from the averaged acoustic pressure data, wherein the flow rate is determined based on the root mean square.

11. The method of claim 1, further comprising:
    logging the wellbore with an acoustic sensing tool that includes the at least one acoustic sensor, wherein the acoustic pressure data is obtained using logged measurements from the acoustic sensing tool.

12. A non-transitory computer-readable storage medium including instructions that, when executed by a processor, cause the processor to perform a method, the method comprising:
    directing a drilling assembly to drill a wellbore penetrating a subterranean formation, the wellbore being drilled for a plurality of depth zones,
    obtaining acoustic pressure data associated with a leak source from each of the plurality of depth zones in the wellbore using at least one acoustic sensor of an acoustic sensing tool positioned within the wellbore during the drilling operations, the acoustic pressure data being obtained as a function of time for a specified time period, wherein the acoustic pressure data includes a plurality of data segments that respectively correspond to one of a plurality of non-overlapping time windows of the specified time period;
    filtering signal contributions corresponding to the acoustic sensing tool from the acoustic pressure;
    averaging the acoustic pressure data from different windows of the plurality of non-overlapping time windows;
    determining a flow rate of the leak source using the averaged acoustic pressure data;
    determining an area of the leak source from the flow rate of the leak source;
    generating a representation of the leak source using the flow rate and the area of the leak source; and
    determining whether the leak source is a liquid-to-liquid domain or a gas-to-gas domain of a subterranean formation, wherein the flow rate of the leak source is determined using a first set of terms of a plurality of terms when it is determined that the leak source is in the liquid-to-liquid domain, wherein the flow rate of the leak source is determined using a second set of terms of the plurality of terms when it is determined that the leak source is in the gas-to-gas domain.

13. The non-transitory computer-readable storage medium of claim 12, wherein the plurality of terms includes a first term indicating a fluctuation of mass flow rate through the leak source, a second term indicating a fluctuation of shear stresses through the leak source, a third term indicating a mixing of fluids after a leaking fluid exits the leak source, and a fourth term indicating a noise-source efficiency effect of a specific geometry of the leak source.

14. A system comprising:
   an acoustic sensing tool;
   one or more processors; and
   a non-transitory computer-readable medium coupled to the acoustic sensing tool to receive data from the acoustic sensing tool and encoded with instructions that, when executed by the one or more processors, cause the one or more processors to perform operations comprising:
   directing a drilling assembly to drill a wellbore penetrating a subterranean formation, the wellbore being drilled for a plurality of depth zones,
   obtaining, once the acoustic sensing tool is deployed into the wellbore, acoustic pressure data associated with a leak source from each of the plurality of depth zones in the wellbore using at least one acoustic sensor of the acoustic sensing tool during the drilling operations, wherein the acoustic pressure data is obtained as a function of time for a specified time period, wherein the acoustic pressure data includes a plurality of data segments that respectively correspond to one of a plurality of non-overlapping time windows of the specified time period;
   filtering signal contributions corresponding to the acoustic sensing tool from the acoustic pressure data;
   averaging the acoustic pressure data from different windows of the plurality of non-overlapping time windows;
   determining a flow rate of the leak source using the averaged acoustic pressure data, and an area of the leak source using the flow rate of the leak source, wherein the flow rate is determined using a plurality of terms representing different sources of sound generation, wherein each of the plurality of terms includes a different predetermined coefficient, wherein the plurality of terms includes a first term indicating a fluctuation of mass flow rate through the leak source, a second term indicating a fluctuation of shear stresses through the leak source, a third term indicating a mixing of fluids after a leaking fluid exits the leak source, and a fourth term indicating a noise-source efficiency effect of a specific geometry of the leak source; and
   generating a representation of the leak source using the flow rate and the area of the leak source.

15. The system of claim 14, wherein the operations further comprise:
   determining whether the leak source is in a first domain or a second domain of a subterranean formation,
   wherein the flow rate of the leak source is determined using a first set of terms of the plurality of terms when it is determined that the leak source is in the first domain,
   wherein the flow rate of the leak source is determined using a second set of terms of the plurality of terms when it is determined that the leak source is in the second domain.

* * * * *